(12) United States Patent
    Crummey

(10) Patent No.: US 9,474,198 B1
(45) Date of Patent: Oct. 25, 2016

(54) VEHICLE POWERED SWEEPER/EDGER DEVICE

(71) Applicant: Glenn Dewight Crummey, Baxley, GA (US)

(72) Inventor: Glenn Dewight Crummey, Baxley, GA (US)

( * ) Notice: Subject to any disclaimer, the term of this patent is extended or adjusted under 35 U.S.C. 154(b) by 74 days.

(21) Appl. No.: 14/167,673

(22) Filed: Jan. 29, 2014

Related U.S. Application Data

(60) Provisional application No. 61/849,609, filed on Jan. 30, 2013.

(51) Int. Cl.
    *A01D 34/84* (2006.01)
    *A01B 49/04* (2006.01)

(52) U.S. Cl.
    CPC ............... *A01B 49/04* (2013.01); *A01D 34/84* (2013.01)

(58) Field of Classification Search
    CPC .... A01D 34/84; A01D 34/835; A01D 34/00; A01D 34/43; A01D 34/42; A01D 32/246; A01B 49/04; A01B 49/00
    See application file for complete search history.

(56) References Cited

U.S. PATENT DOCUMENTS 2,502,468 A * 4/1950 Marihart ............... A01B 41/06
                                                   172/103

* cited by examiner

*Primary Examiner* — Christopher J Novosad
(74) *Attorney, Agent, or Firm* — Jonathan R. Smith; Jonathan Rigdon Smith, J.D., PC

(57) ABSTRACT

A vehicle-powered sweeper/edger for sidewalks can edge either both sides of a sidewalk or only one side or curbs, track the edge path automatically, sweep and clean the sidewalk, and apply herbicide, and requires a single operator.

4 Claims, 3 Drawing Sheets

VEHICLE POWERED SWEEPER/EDGER DEVICE

CROSS-REFERENCES TO RELATED APPLICATIONS

This is a non-provisional U.S. Patent Application claiming priority of U.S. Provisional Patent Application No. 61/849,609, filed Jan. 30, 2013.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

REFERENCE TO A BIOLOGICAL SEQUENCE LISTING

Not applicable.

BACKGROUND OF INVENTION

1. Field of the Invention

This invention is in the broad field of earth working, more specifically street sweepers and mowers, and most specifically, edgers. It is also in the field of abrading devices.

2. Description of the Related Art

Most commercial edgers are highly labor intensive requiring a user to operate a machine in a slow, deliberate fashion (or in some cases accomplished entirely manually). A commonly-used pavement edger comprises a motor-driven rotating blade guided by a wheel on the end of a hand-held shaft. With this unit and others like it, only one side of a sidewalk can be edged at a time. Following the edging process, one or more persons must remove soil and debris from the sidewalk either by hand or powered brush.

Sidewalk and road brushes already exist, usually in the form of cylindrical brushes that rotate on a horizontal axis normal to the direction of travel. They are either mounted on the vehicle or attached by a hitch and driven by a pulley or shaft. However, edging and cleanup have remained tedious and commercially expensive affairs that typically require multiple employees and valuable labor hours.

BRIEF DESCRIPTION OF THE INVENTION

Objects of the Invention

The objects of this invention are to (1) edge either both sides of a sidewalk or, if necessary, edge only one side or curbs, (2) sweep and clean the sidewalk, (3) apply a herbicide and (4) require only one operator, with the overall object to achieve significant savings in labor time and costs.

SUMMARY OF THE INVENTION

The instant invention is a specially-configured hydraulically-powered sidewalk sweeper and edger ("sweeper") pushed by a small vehicle ("power unit"). It relates to grass edging with special consideration toward commercial industrial and municipal applications. The device allows a single operator to edge sidewalks and street curbs quickly and accurately while simultaneously removing grass and soil debris from the walkways.

The sweeper portion is comprised of two articulating housings which are mounted to the power unit and are articulable up and down. The rear housing is mounted to the power unit and is used to collect the grass and debris thrown from the front housing's brushes. The front housing contains the sweeping and cutting brushes and is designed to "float" independently of the rear housing. These housings operate in such a fashion that when the front housing is lowered to the sidewalk, the brushes sweep dirt and debris back into the rear area. The rear housing rides on leveling and retractable guide wheels in contact with the pavement and on one or more trailing guide wheels. The front housing is supported in back by the rear housing and in front by one or more leading guide wheels of adjustable height.

The brush mechanism in the front housing is driven by a hydraulic motor connected to the power unit's hydraulic system and has both sidewalk surface and edging brushes. Right and left edging brushes may be actuated independently. Edging blades or the equivalent are intended to fall within the scope of this invention. Hereinafter in this description, such brushes or blades will referred to as "cutters." A herbicide applicator nozzle is positioned between the rear housing and the power unit.

The invention is also equipped with side shift fine direction control operable from inside the cab, and the forward end of the unit is equipped with obstacle diversion flanges.

DETAILED DESCRIPTION OF THE INVENTION

The basic hydraulically-powered sidewalk sweeper is a device composed of two articulating housings. The rear housing is mounted to the power unit and is used to collect the grass and debris thrown from the front housing's brushes. The front housing contains the sweeping and cutting brushes and is designed to "float" independent of the rear housing. These housings operate in such a fashion that when the unit is lowered to the sidewalk, the brushes sweep dirt and debris back into the rear area where it will be dumped when full into a truck or to a designated site.

Figure 1:
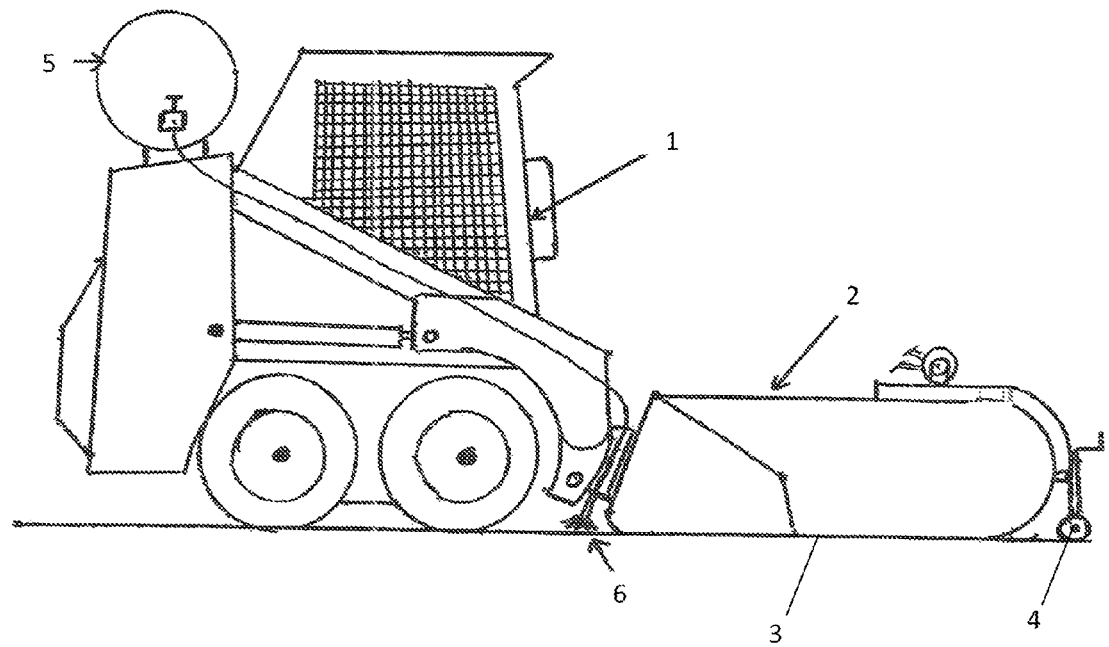
FIG. 1 is a side view of the invention being pushed by a power unit.

Referring now to the drawings, in which like reference numerals refer to like parts in the various figures, FIG. 1 is a side view of the invention, a modification of the aforementioned basic sweeper, being pushed by a power unit. The power unit 1 shown here is a Bobcat G series skid steer loader or equivalent. It is shown pushing the preferred embodiment of the invention, a sweeper/edger device 2, along a sidewalk surface 3. One of the inventive aspects shown in this view is one or more forward adjustable leveling wheels 4. This overall view also depicts a herbicide supply system comprising a herbicide tank 5 feeding an array of spray tips 6. The system may be gravity fed as shown or include a pressure pump. The purpose of this installation is to dispense an effective herbicide along the sidewalk edge following the edging process. The operator-controlled pump sends the herbicide to each of the trailing mounted spray tips 6 positioned in such a way that an effective application is achieved. This special application of herbicide will tremendously reduce the amount of regrowth and thus reduce annual re-edge requirements.

Figure 2:
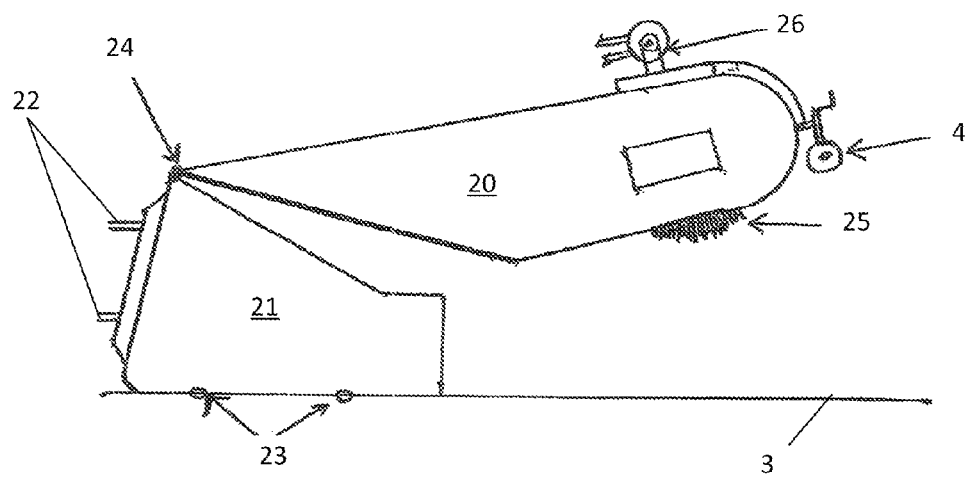
FIG. 2 is a side view of the invention showing the front and rear housings.

FIG. 2 is a side view of the invention showing its front (cutting and sweeping) housing 20 and rear (debris) housing 21. The rear housing 21 is itself articulable in a vertical plane relative to the power unit (not shown in this view) through the hitch assembly 22, allowing the operator to lower the rear housing 21 onto the sidewalk 3 so that it rides on the sidewalk on preset guide wheels 23 on the undersides of the rear housing 21. All wheels in this invention that contact pavement are made of material that will not leave marks on pavement. Front housing 20 then articulates in a vertical plane relative to rear housing 21 at hinge 24 as either the fibrous sidewalk brush 25 or the forward adjustable leveling wheels 4 encounter shifts in the height of the upcoming sidewalk 3. When the brush 25 is on the sidewalk 3, it throws debris backwards (to the left in this view) into the rear housing 21 for later dumping. FIG. 2 also points out one of two edging cutter motors 26.

Figure 3:
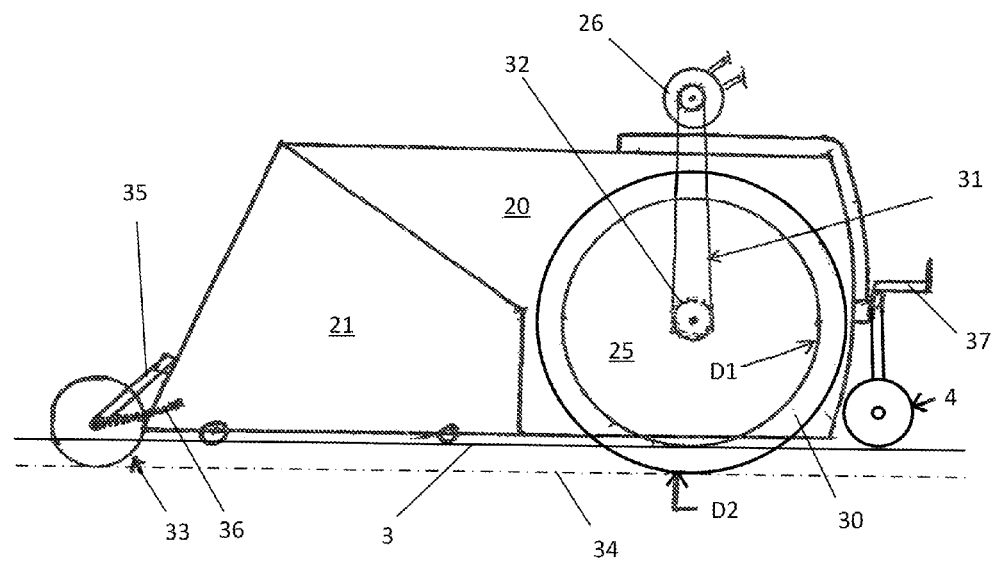
FIG. 3 is a side view of the invention showing internal parts.

FIG. 3 is a right side view of the invention showing internal parts and additional details of the invention. Inside front housing 20 is the sidewalk brush 25 having a diameter D1. Rotating coaxially with the sidewalk brush 25 are two knotted wire (or equivalent) edging cutters 30 having a diameter D2 (one on each end of the fibrous sweeping sidewalk brush 25). Diameter D2 is preferably about 4 inches greater than D1. This enables the edging cutter to dig along the edge of the sidewalk to a 2-inch depth while the sweeping brush 25 brushes the surface of the sidewalk. A hydraulic motor 26 is shown here, which drives the wire edging cutters 30 through a chain 31 and sprocket 32. This is a preferred drive means because of the substantial torque required, but other means of rotating these cutters such as pulley(s) and belt(s) are included within the scope of this invention without limitation. Rear housing 21 is also equipped with at least one trailing guide wheel 33 which is designed to follow the trough 34 created at the edge of the sidewalk 3. Note that the wheel 33 pivots relative to the rear housing 21 on an arm 35, which may be raised and lowered from within the cab. The arm 35 is biased downwardly into the trough by a spring 36. The spring bias is set so as to prevent the wheel 33 from tracking out of the trough 34 created by the edging cutter 30, while not being so tight as to lift the rear housing 21 off of the sidewalk 3. This figure also shows that forward adjustable leveling wheel 4 can be adjusted up or down by turning handle 37. A remote adjustment such as a hydraulic cylinder or servomotor with in-cab control is also within the scope of this invention.

Figure 4:
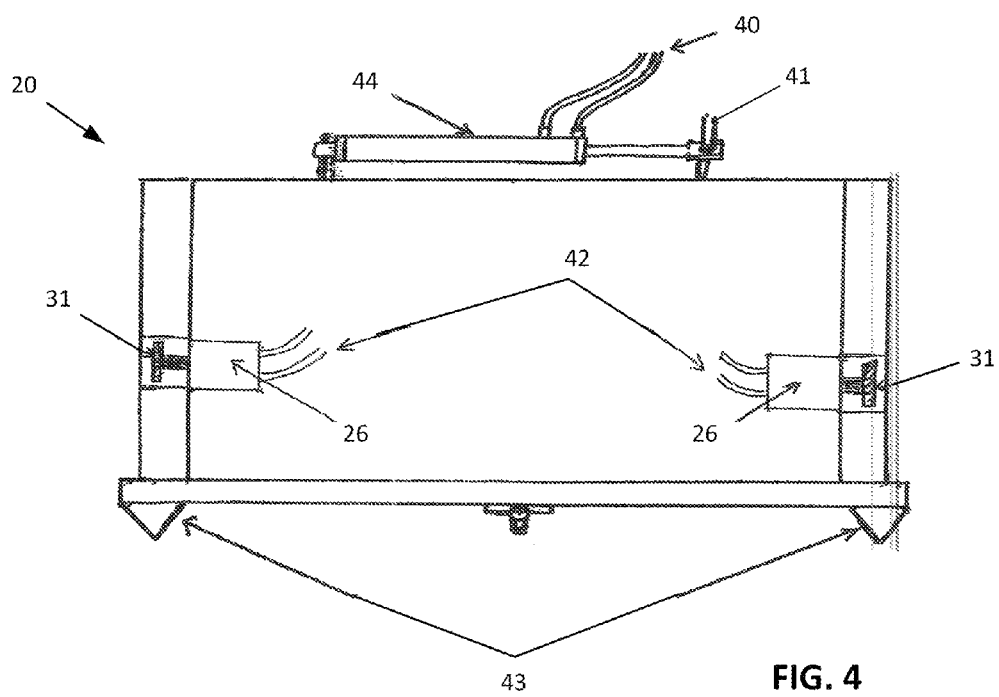
FIG. 4 is a top view of the front housing of the invention.

FIG. 4 is a top view of the front housing 20 showing additional features of the invention. These include a hydraulically operated side shift feature that allows the operator to maintain crucial alignment of the machine as it tracks down the sidewalk. In-cab controls regulate pressure to a horizontal hydraulic cylinder 44 through cylinder hoses 40 which move front housing 20 to the left or right relative to the rear housing (represented here by fixed pin 41). This remotely-actuated device provides the fine adjustments that may be necessary to keep the cutters in their proper positions and also to help center the machine at the beginning of work. Additionally, the side shift feature can be utilized to align one of the cutters over a street curb thus allowing the machine to edge roadway curbs as well as sidewalks.

This figure also shows how the edging cutters (not visible in this view) are controlled separately as noted above. A hydraulically operated chain drive system with an in-cab controller allows the operator to engage one end cutter only or engage both ends simultaneously. Left and right hydraulic circuits 42 power left and right edger motors 26, which turn left and right chains 31. This critical modification gives the machine the ability to edge curbs or one side of the sidewalk if necessary without the opposite end being engaged. In a typical edging operation this brush/cutter arrangement will edge the outside of both sides of the sidewalk while the inner standard height fibrous brush will sweep the debris into the back section of the housing. In certain extreme inter-sidewalk grassy conditions, the fibrous sweeping brush may temporarily be replaced with a more aggressive type of wire brush. Also note in this figure the forward end of the unit is equipped with obstacle diversion flanges 43, which push objects off the pavement edge where they could otherwise be damaged or damage the machine.

Figure 5:
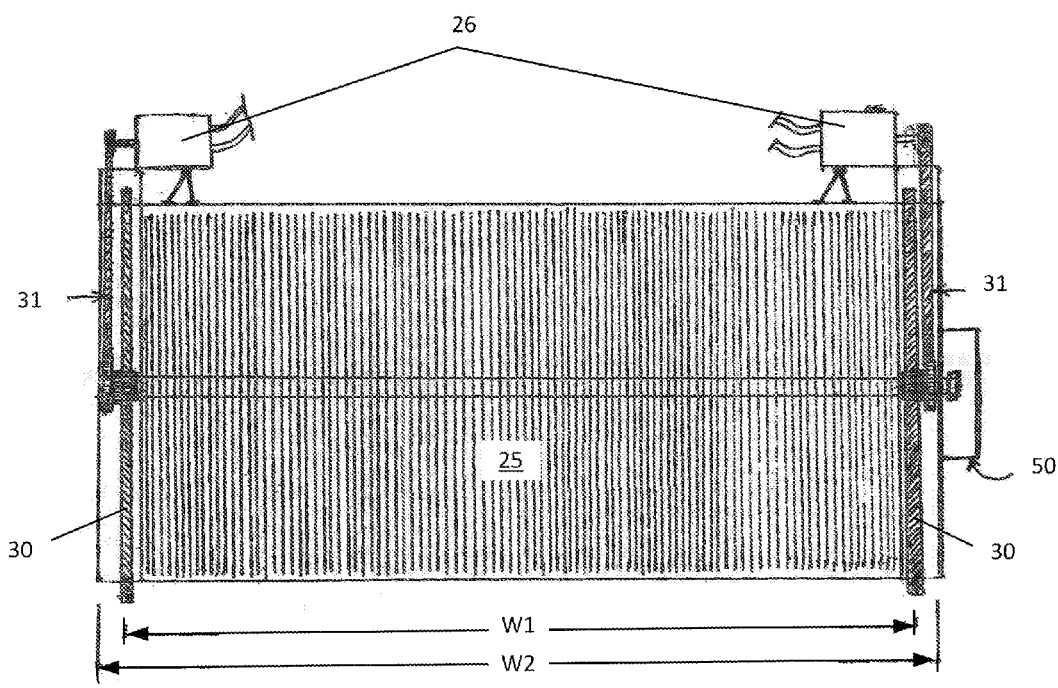
FIG. 5 is a front view of the internal parts of the front housing.

FIG. 5 is a front view of the internal parts of the front housing. Existing sweeper brushes have an essentially standard width of 72 inches, but because the width of a standard sidewalk is 60 inches, the preferred width between the centers of the two edger cutters W1 is 60 inches. The overall housing width W2 is therefore preferably 65.5 inches. This illustration is a better view of the two edging cutters 30 and the hydraulic motors 26 and chains 31 (preferably #50, with mating sprockets at either end) that drive them. Also visible is the separate hydraulic drive motor 50 for the fibrous sidewalk sweeper brush 25.

The above embodiments are intended to be illustrative, rather than limiting, of the spirit and scope of the invention. It is intended that the invention embrace all alternatives, modifications, and alterations that fall within the spirit and scope of the appended claims.

The invention claimed is:
1. A pavement sweeper/edger device, comprising:
a rear housing comprising
   a closed back end, an open front end, and upper surface and a lower surface;
   the back end comprising
      means for attachment to a hitch assembly of a power unit;
   the front end comprising
      first horizontal pivot means proximate to the upper surface;
a front housing comprising
   an open rearward end, a closed forward end and a top surface;
   the forward end being supported on the pavement by at least one forward leveling wheel;
   the open rearward end having second horizontal pivot means proximate to the top surface pivotably engaged to the first horizontal pivot means on the rear housing so that the front housing can articulate in a vertical plane relative to the rear housing;
a substantially cylindrical pavement brush having
   a horizontal axle extending horizontally a predetermined pavement width, a first diameter, and a pavement brush rotating motor;
two substantially cylindrical edging cutters
   disposed at opposite ends of the pavement brush and coaxially with the horizontal axle, each extending horizontally a trough width and a second diameter;

the second diameter being greater than the first diameter;

each edging cutter having one of two edging cutter rotating motors;

at least one trailing guide wheel disposed proximate to the closed back end of the rear housing and rolling forwardly within a trough when the pavement sweeper/edger device is pushed forward; and means for connecting each motor to the power unit.

2. The device of claim 1, comprising:

means for shifting said front housing leftwardly and rightwardly relative to said rear housing in a direction perpendicular to the direction of movement of said power unit.

3. The device of claim 2, comprising:

at least one spray nozzle proximate to said closed back end, connected to a means for supplying herbicide to the at least one spray nozzle.

4. The device of claim 3, comprising:

obstacle diversion flanges disposed on said closed forward end and in the path of each of said edging cutters.

* * * * *